United States Patent [19]
Stauffer et al.

[11] 4,254,330
[45] Mar. 3, 1981

[54] LOW FREQUENCY ENHANCEMENT RANGE FINDING EQUIPMENT

[75] Inventors: Norman L. Stauffer, Englewood; Dennis J. Wilwerding, Littleton, both of Colo.

[73] Assignee: Honeywell Inc., Minneapolis, Minn.

[21] Appl. No.: 74,845

[22] Filed: Sep. 13, 1979

[51] Int. Cl.³ .............................................. G01J 1/20
[52] U.S. Cl. ....................................... 250/201; 250/204
[58] Field of Search ............... 250/201, 204, 208, 209, 250/578; 354/25

[56] References Cited
U.S. PATENT DOCUMENTS

| | | | |
|---|---|---|---|
| 4,002,899 | 1/1977 | Stauffer | 250/204 |
| 4,078,172 | 3/1978 | Wilwerding | 250/201 |

*Primary Examiner*—David C. Nelms
*Attorney, Agent, or Firm*—Charles J. Ungemach

[57] ABSTRACT

Apparatus for determining the direction a lens should be moved in order to provide a proper focus of a remote object on a predetermine plane. A plurality of radiation detectors are positioned to receive radiation in first and second patterns from the object and to produce signals in accordance therewith. A first plurality of radiation detectors produces signals indicative of the radiation received in the first pattern while a second plurality of radiation detectors produces signals indicative of the radiation received in the second pattern. The two patterns coincide at the proper focus but at other than the proper focus the two patterns are spaced from one another in a direction which depends upon the direction the lens should be moved to achieve proper focus. The low frequency components in the patterns are determined by taking the sums of the outputs of groups of detectors in the first and second plurality of detectors so that individual fluctuations in individual detectors are smoothed. The absolute value of the difference between the summed signal from a first group in the first pattern and the summed signal from a first group in the second pattern is compared with the absolute value of the difference between the sum from a second group in the first pattern and the sum from a second group in the second pattern. The result is summed over a predetermined range and a characteristic of the summed value is indicative of the direction the lens should be moved.

15 Claims, 9 Drawing Figures

LOW FREQUENCY ENHANCEMENT RANGE FINDING EQUIPMENT

BACKGROUND OF THE INVENTION

In a copending application of Norman L. Stauffer, Ser. No. 912,688, filed June 5, 1978, a range determination system is shown which is useable in a through-the-lens camera for positioning the taking lens at a desired correct focus position with respect to a remote object within the field of view. That system utilizes a plurality of small detectors such as charge coupled devices (CCD) or charge injection devices (CID) mounted in an array to receive radiation from the scene being viewed. The detectors are arranged in pairs with each pair being mounted behind a small lenslet so that each pair receives a view of the exit pupil of the taking lens but one of the detectors in each pair receives radiation primarily from a first portion of the taking lens while the other of the detectors in each pair receives radiation primarily from a different portion of the taking lens. The result is to create two similar curves indicative of the radiation distribution pattern from the scene being viewed. At the proper focus position the two curves coincide, but as the object changes position wih respect to the camera, the two curves move with respect to each other to indicate an out-of-focus situation. The two curves move with respect to each other in a first direction when the object is closer to the camera than the desired focus position and move in an opposite direction with respect to each other as the object moves further from the camera than the desired focus position. By determining the direction of movement of the two curves with respect to each other, it is therefore possible to determine the direction that the taking lens has to be moved to achieve the desired focus position.

In a copending application of Norman L. Stauffer and Dennis J. Wilwerding, Ser. No. 16,595, filed Mar. 1, 1979, an improvement on the above-mentioned copending application Ser. No. 912,688, was filed June 5, 1978, now U.S. Pat. No. 4,185,191 was disclosed wherein a method and apparatus for determining the direction in which the two similar curves need to be moved in order to produce the coincidence indicative of a proper focus position is disclosed. In that application a value indicative of the slope of the curves at predetermined points is obtained and this value is multiplied by the difference in the value of the output of the detectors at such points. The product is summed over a predetermined range. The summation value is substantially zero when the two curves coincide but will have a characteristic such as plus or minus to indicate the direction the taking lens must be moved when the two curves do not coincide.

In a copending application of Dennis J. Wilwerding and James D. Joseph, Ser. No. 58,964, filed July 20, 1979, an improvement on the above-mentioned copending applications was disclosed wherein the need for taking the product of a value indicative of the slope of the curves and a value indicative of the difference in the value of the output of detectors is eliminated and in lieu thereof a first signal representative of the absolute magnitude of the difference between the outputs of two detectors, one from each of the curves, is produced and a second signal representative of the absolute magnitude of the difference between the outputs of two other detectors, one from each of the curves, is also produced. The two absolute magnitude signals are differenced and the result is summed over a predetermined range. The resultant summed signal will be substantially 0 when the two curves coincide, will have a first characteristic such as a negative sign when the two curves are displaced in the first direction and a second characteristic such as a positive sign when the two curves are displaced in the opposite direction so as to provide the desired direction signal for the motor to drive the taking lens.

The above-mentioned copending applications disclose circuitry that operates satisfactorily in nearly all cases but as was mentioned in these applications, rare situations can occur with highly repetitive or high frequency patterns in the scene being viewed so that the resultant summed signal may reverse its sign with large displacements from proper focus position and thus produce a condition where the system would respond to a, for example, positive sign instead of a proper negative sign and move the lens in the wrong direction.

SUMMARY OF THE INVENTION

The apparatus of the present invention operates to prevent the false 0 cross-over situation above described by averaging the outputs of several detectors that receive the high frequency repetitive patterns so as to produce a summation signal which, in effect, is responding to low frequency variations in the pattern. The resulting summation signal does not then change sign after the true 0 cross-over position even with large displacements of the lens from proper focus position. To convert the high frequency signal to one of low frequency, the detectors are handled in groupings, for example eight detectors at a time, so that instead of seeing the output of individual detectors which may vary from one detector to another in a high frequency fashion, the outputs of the group of detectors are averaged and thus low frequency changes are observed. In one embodiment of the present invention, the prior art high frequency responsive circuit is combined with the low frequency responsive circuit of the present invention to provide an additional benefit of greater slope at the proper 0 cross-over position which allows greater accuracy in precisely locating the proper lens position.

BRIEF DESCRIPTION OF THE DRAWINGS

FIG. 1;

DETAILED DESCRIPTION OF THE PREFERRED EMBODIMENTS

Figure 1:
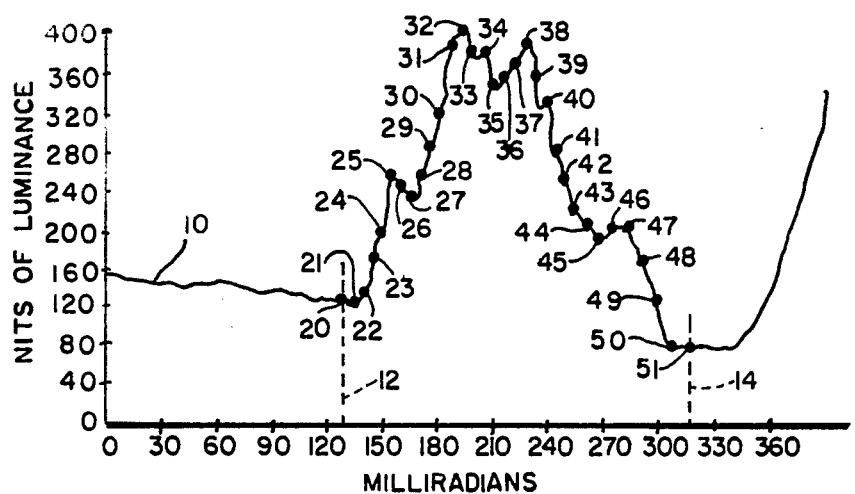
FIG. 1 shows a distribution pattern as may be produced by the detectors when sensing a relatively normal scene and when the lens is at the proper focus position.

In FIG. 1, a curve 10 is shown representing the pattern of light intensity that might be produced by the detectors of the above-mentioned copending applications when the subject being viewed is in proper focus at the image plane of the taking lens. The lenslets in front of the detectors in the above-mentioned copending applications are placed at the same distance from the taking lens of the camera as the film and receive at least a portion of the same light distribution pattern from the scene being viewed. The detectors in the array produce output signals in accordance with the radiation intensity they receive so as to produce the curve 10. The detector array might consist of a single row of detector pairs or may comprise several rows or some pattern such as parallel rows or crossed rows or other configurations. Rows of detectors might be mounted horizontally so as to receive light along a horizontal portion of the pattern, vertically so as to receive light along a vertical portion of the pattern or diagonally so as to receive the light pattern as it exists along a diagonal of the scene being viewed. An advantageous arrangement is to mount one or more rows of detectors diagonally since normal repetitions of patterns in nature seldom occur in diagonal directions while vertically arranged scenes, such as picket fences or forests and horizontally arranged scenes such as sky lines and roadways, might produce some difficulty when detector arrays are mounted vertically or horizontally. The detectors may extend clear across the scene being viewed or may be mounted to receive only a portion of the total distribution pattern available.

In FIG. 1, the ordinant of curve 10 is shown as luminance and the curve is seen to extend from a low of about 40 nits to a high of about 400 nits while the abscissa is in milliradians across the image being viewed and the curve is seen to extend from 0 to approximately 360 milliradians. The amount of luminance will, of course, vary with the lighting and composition of the scene being viewed and the size of the scene image at the image plane will vary with the focal length of the lens. In FIG. 1, the luminance is that equivalent to a normally lighted room and the extent of the curve is approximately one half of the angular field of a 50 millimeter focal length lens.

In FIG. 1, two dashed lines 12 and 14 are shown extending vertically from about 130 milliradians and about 320 milliradians respectively. In the following analysis, it will be assumed that the detector array receives the pattern of FIG. 10 in this area from 130 milliradians to 320 milliradians and that there are 32 detector pairs between these two points although other numbers of detectors may be employed. In actual practice, the 32 pairs of detectors would be mounted in an array approximately five millimeters in length which, with a 50 millimeter lens, would extend approximately 100 milliradians across the distribution pattern.

In FIG. 1, it will be assumed that the 32 detector pairs are equally spaced (although equal spacing is not necessary and in fact for periodic patterns it may be desirable to have unequal spacing) and produce output signals at points along curve 10 identified by reference numerals 20 through 51 which output signals correspond in magnitude to the amount of radiation they receive. In FIG. 1, the situation is as it would exist when the taking lens is in focus so that both of the detectors in each of the pairs are receiving the same amount of radiation and produce the same magnitude output signal. As described in the above-referred to copending applications, if the object were to move further away from the taking lens than is the case shown in FIG. 1, the output of the detectors would change so that two similar curves would appear to move away from each other in a first manner. If the object were to move closer to the taking lens than is the case in FIG. 1, again two curves would appear but would move apart from each other in an opposite manner.

Figure 2:
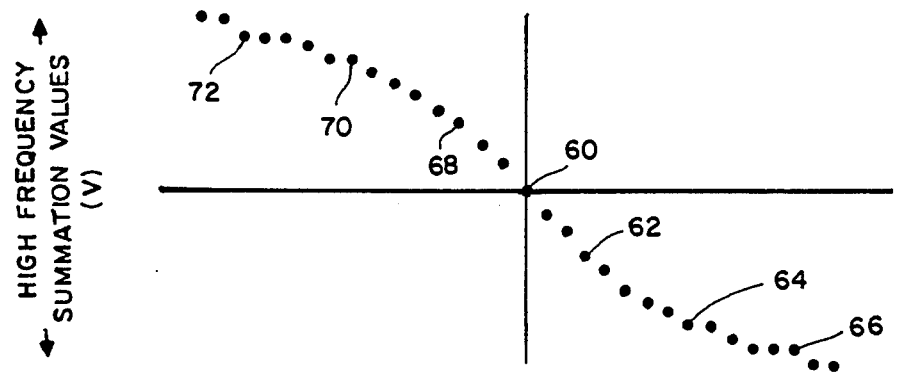
FIG. 2 shows a graph with points therealong representing various summations obtained from the pattern of FIG. 1 by the prior art circuit for various focus conditions.

In the above-referenced copending applications, it was seen that by taking the values of the outputs of the detectors and summing them in a predetermined manner a curve could be obtained that would cross a reference axis at the proper focus position. FIG. 2 shows a graph of values that might be obtained from the summations given by the high frequency responsive circuitry in the above-referred to copending application Ser. No. 58964 as the object moves away from the focus position in both directions.

Figure 4:
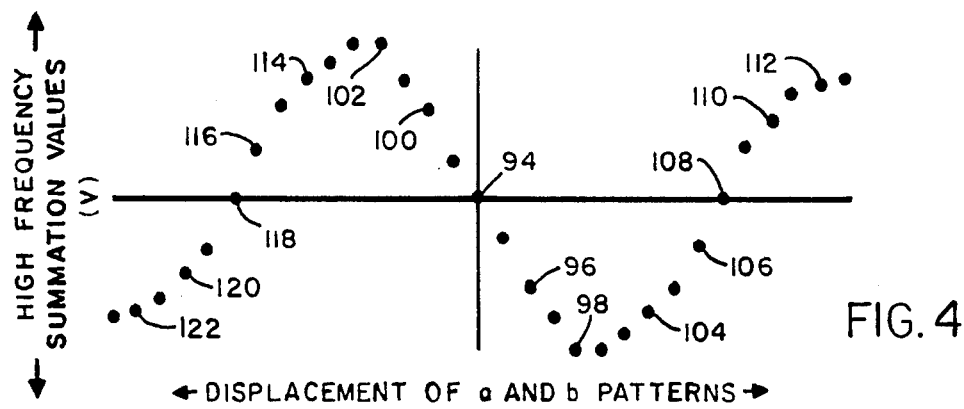
FIG. 4 shows a graph with points therealong representing various summations that might be obtained from the pattern of FIG. 3 by the prior art circuit for various focus conditions.

The ordinate represents values (V) obtained by the summation while the abscissa represents increasing amounts of displacement, right and left, of the two patterns from coincidence at the center and thus the out-of-focus extent. A point 60 in FIG. 4 shows that the summation is zero when the displacement of the two patterns is as shown in FIG. 1 which is the "in focus" condition. The value of the summation becomes generally more negative as shown by points 62, 64 and 66, for example, as the object to be focused on moves further and further from the camera. As the object moves closer and closer to the camera, the value of the summation becomes generally more positive with further and further displacements from proper focus as is shown generally by points 68, 70 and 72. As was mentioned in the above copending applications, with certain repetitive patterns the value of the sum may reverse when large displacement from proper focus conditions occur.

Figure 3:
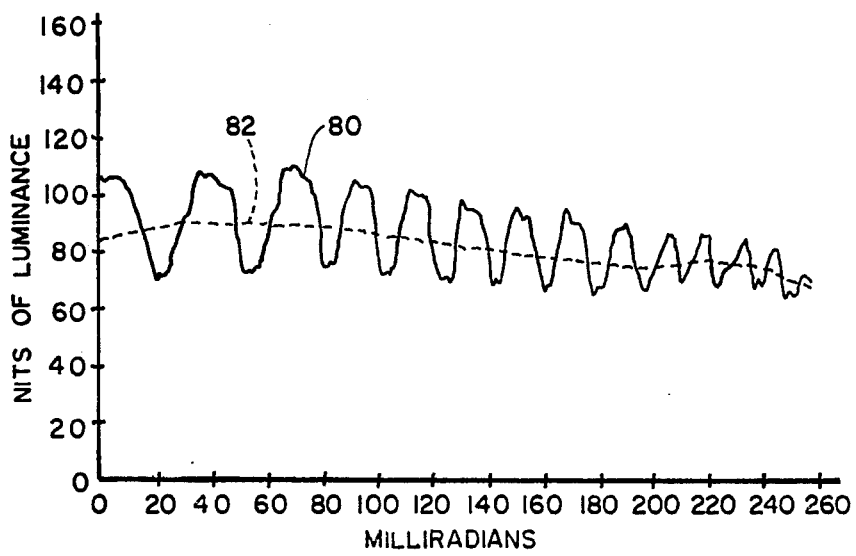
FIG. 3 shows a distribution pattern as may be produced by the detectors when subjected to a high frequency or repetitive scene and when the lens is at a proper focus position.

FIG. 3 shows a highly repetitive or high frequency pattern that might be experienced with some scenes being viewed. In FIG. 3, a curve 80 is shown on a graph similar to that of FIG. 1 wherein the ordinate of the curve is luminance, and in this case, the curve 80 extends from a low of about 60 nits to a high of about 120 nits and the abscissa is in milliradians across the image being viewed and, in this case, extending from 0 to approximate 260 milliradians. In FIG. 3, the detector pairs have been omitted for simplicity but, as in the case with FIG. 1, they would be located in the middle portion of curve 80 and would produce output signals in the same manner as described above.

It is seen that the pattern of FIG. 3 is highly repetitive but on the average the curve tends to move downwards to the right. This average curve, shown as dashed line 82, represents the low frequency component that exists in curve 80.

FIG. 4 shows a graph of the values that might be obtained for a high frequency summation given by the apparatus of the above-mentioned copending application Ser. No. 58,964, as the object moves away from the proper focus condition. In FIG. 4, as was the case in FIG. 2, the ordinant represents values (V) obtained by the summation while the abscissa represents increasing amounts of displacement right and left of the two patterns from coincidence at the center and thus the out-of-focus extent. Point 94 in FIG. 4 shows that the summation is 0 when the displacement of the two patterns is as shown in FIG. 3 which is the proper "in focus" condition. The value of the summation becomes generally more negative as shown by points 96 and 98 as the object moves further and further from the camera. As the object moves closer and closer to the camera, the value of the summation becomes generally more positive as is shown by points 100 and 102. Because of the highly repetitive pattern, the curve of FIG. 4, after reaching point 98 in the negative direction, begins becoming more positive again as is shown by points 104 and 106 until it again recrosses the axis at point 108 and is then more and more positive as is shown by points 110 and 112. Likewise, as the object moves further and further from the camera, the positive portion of the curve reaches a peak at 102 and then starts becoming more and more negative as is shown by points 114 and 116 until it again crosses the axis at point 118 and thereafter becomes more and more negative as is shown by points 120 and 122. If the lens were badly out of focus, that is further from the proper focus position at point 94 in FIG. 4 than at either point 108 or 118, then the system of the prior art would cause the lens to move in the wrong direction until the end of its drive or until the next 0 cross-over point beyond 108 or 118 was reached and in either case the system would indicate an erroneous in focus condition.

To avoid this problem, the present invention operates to utilize the outputs of groups of detectors rather than the outputs of individual detectors in the summation process to obtain a curve more indicative of the average or low frequency components such as curve 82 existing in the repetitive pattern, curve 80, of FIG. 3.

In the discussion that follows, it will again be assumed that the 32 detector pairs are utilized in the detector array and that these are utilized in three groups of eight detectors each. A first of the detectors in each of the pairs will be referred to by the letter "a" and the second of the detectors in each pair will be referred to by the letter "b". The subscripts 1-32 will be used to identify the individual detectors. It should be understood that a greater or lesser number of detectors than 32 may be employed and the groupings could be of other than eight detectors as in the present example.

In the apparatus of the copending application Ser. No.58,964, the summation was obtained using the expression:

$$\sum_{1}^{m-1} |a_n - b_{n+1}| - |a_{n+1} - b_n| \quad (1)$$

Because this equation responds to differences between individual single detectors, the resulting summation will vary with the more rapidly changing high frequency changes which exist in the spatial distribution pattern of the scene being viewed.

The present invention calls for an equation which is similar but in which $a_n = a_1 + a_2 + a_3 \ldots + a_8$, $b_n = b_1 + b_2 + b_3 \ldots + b_8$, $a_{n+1} = a_9 + a_{10} + a_{11} \ldots + a_{16}$, and $b_{n+1} = b_9 + b_{10} + b_{11} \ldots + b_{16}$, etc. The summation of the above values is performed three consecutive times so that the outputs of all 32 detectors are utilized. In more general form, the summation is expressed:

$$\sum_{I=0}^{I=2} \left| \sum_{n=8I+1}^{8I+8} (a_n - b_{n+8}) \right| - \left| \sum_{n=8I+1}^{8I+8} (a_{n+8} - b_n) \right| \quad (2)$$

wherein "I" is either 0, 1 or 2. Of course, if different groupings of detectors were employed as for example 36 detectors in four groups of nine, "I" would be either 0, 1, 2 or 3.

By using the expression of equation 2, the high frequency components of the curve of FIG. 3 are averaged so that the summation values for the out-of-focus displacements are indicative of low frequency variation the curve generated does not recross the 0 axis even at large displacements.

Figure 5:
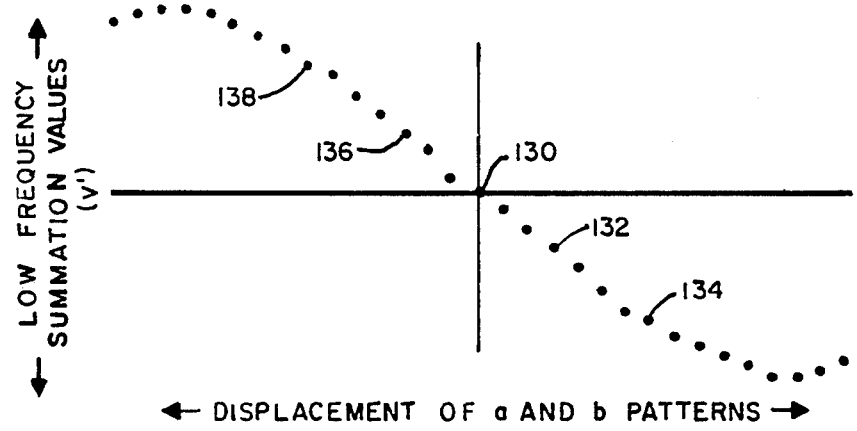
FIG. 5 shows a graph with points therealong representing various summations that might be obtained from the pattern of FIG. 3 by use of the present invention for various focus conditions.

FIG. 5 shows a graph of values that might be obtained for the summation given by equation 2 as the object moves away from the focus position in both directions from the proper focus position. The ordinant represents values (V') obtained by the summation while the abscissa represents increasing amounts of displacement of the two patterns from coincidence. Point 130 in FIG. 5 shows that the summation value is 0 when the displacement of the two patterns is as shown in FIG. 3 which is the "in focus" condition. The value of the summation becomes generally more negative as is shown by points 132 and 134 as the object moves further and further away from the camera. As the object moves closer and closer to the camera, the value of the summation becomes generally more positive as is shown generally by points 136 and 138. It should be noted that while the pattern of FIG. 4 bent back and recrossed the axis at points 108 and 118, this does not occur in FIG. 5 since by the averaging technique of equation 2 the high frequency variations have been removed. Thus, in all cases, a negative signal will indicate the lens must move in a first direction and a positive signal will indicate that the lens must move in the other direction to achieve proper focus. Accordingly, it is seen that by detecting the sign of the summation of equation 2, a signal is created which can in all cases be used to direct the position of the taking lens of the camera towards the desired focus position.

It should be noted that in FIG. 5 the curve has a more gradual slope than the curve of FIG. 4 and approaches the cross-over point 130 at a more acute angle. In some scenes where the low frequency component is very small, it is possible that the more gradual slope could produce a nearly 0 signal before the exact focus position was reached. Although the lens will stop in a position quite close to the exact focus position, in systems where very high accuracy is needed, this effect may be undesirable. To overcome this possible problem, the high frequency curve of FIG. 4 and the low frequency curve of FIG. 5 may be combined to produce a curve which has a steep slope at the cross-over point but which still does not recross the 0 axis at large displacements.

Figure 6:
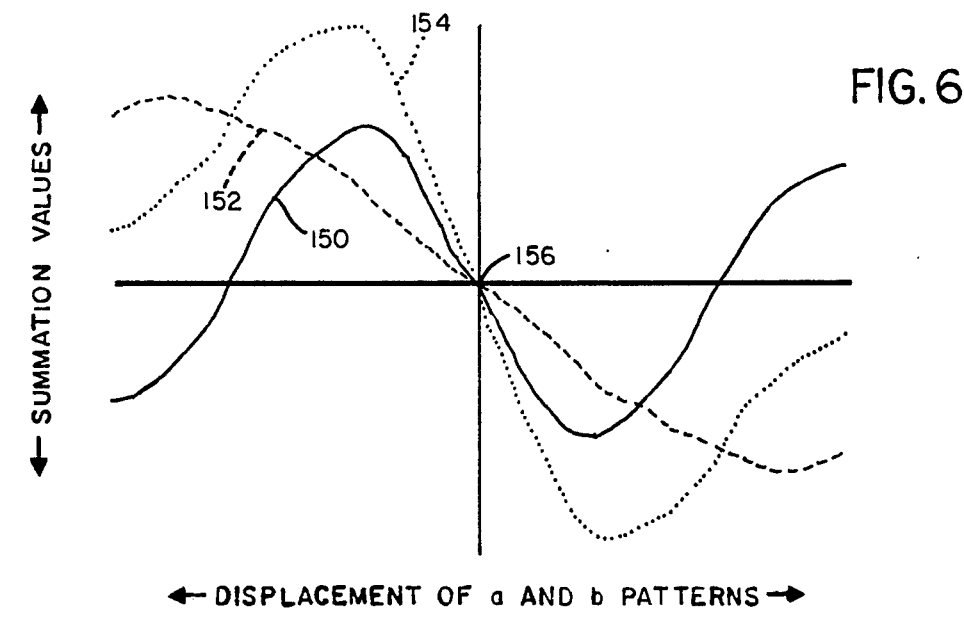
FIG. 6 shows a graph wherein the curves of FIGS. 4 and 5 are combined to produce a composite curve.

FIG. 6 is a graph which shows the high frequency curve of FIG. 4 shown by solid line 150 and the low frequency curve of FIG. 5 shown by dashed line 152 summed together to produce a combination curve shown by dotted line 154. It is seen that curve 154 has a high slope near the proper cross-over point 156 but does not recross the 0 axis even for the highly repetitive scene of FIG. 3. Accordingly, it is seen that by adding the summation signal obtained by the high frequency circuit of copending application Ser. No. 58,964 to the summation signal above described, a resultant curve may be obtained which is useful for both low frequency and high frequency scenes.

Figure 7:
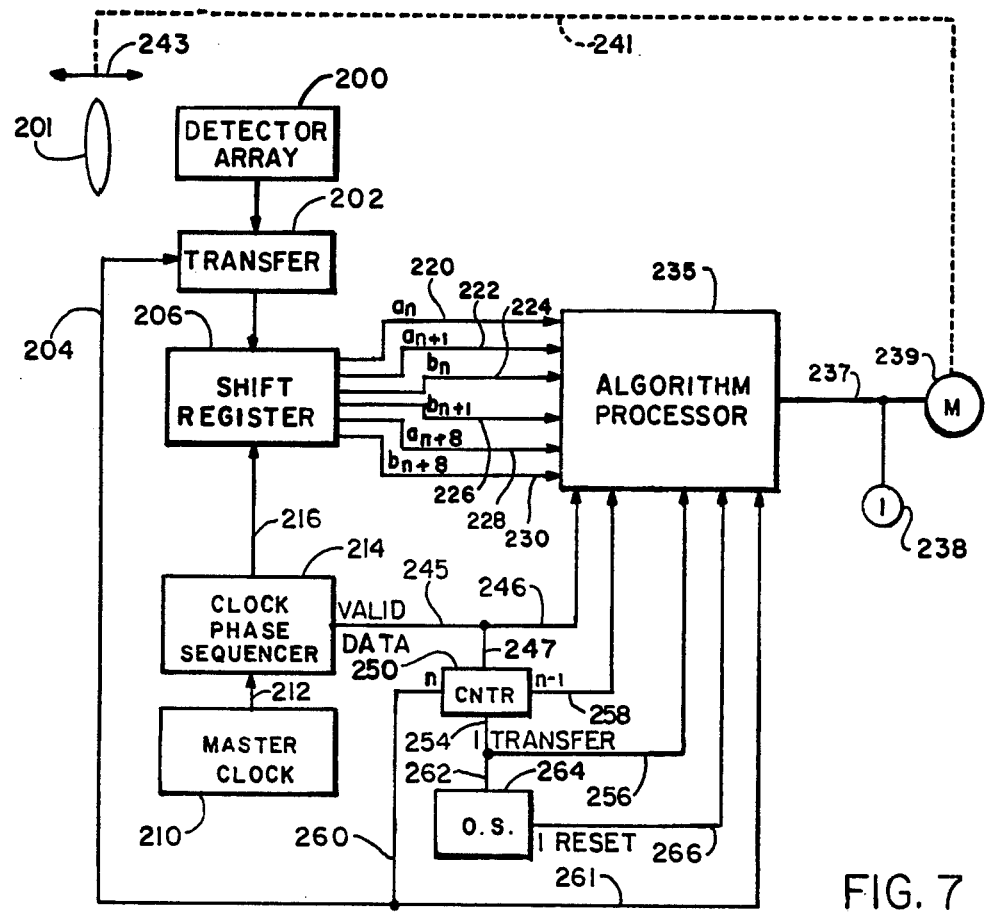
FIG. 7 shows a block diagram of the present invention for the determination of direction of displacement from proper focus position.

FIG. 7 shows a block diagram of a circuit which can be employed to create the low frequency summation signal of equation 2 and, if desired, to create and combine the high frequency summation signal therewith. In FIG. 7, the detector array is identified by reference numeral 200 and is shown mounted to the right of a moveable lens 201 which may be the taking lens of the camera. Detector array 200 may be like those referred to in the above-referred to copending applications and the outputs of the individual detectors are presented to a transfer means 202. Transfer means 202 may be part of a solid state device which acts as a switch operating upon receipt of a signal on line 204 to transfer the various outputs of the detectors to a shift register 206. Shift register 206 may also be formed as part of the solid state device including transfer means 202.

A master clock 210 produces a clock output signal on a line 212 to a clock phase sequencer 214 which produces a three-phase signal on a line 216 to the shift register 206. The signals from the detector array 200 and the transfer device 202 indicative of the amount of radiation received by each of the detectors is stored in the shift register 206 and upon the occurrence of a first clock phase pulse from the clock phase sequencer 214 six signals identified as $a_n$, $a_{n+1}$, $b_n$, $b_{n+1}$, $a_{n+8}$ and $b_{n+8}$ will appear on lines 220, 222, 224, 226, 228 and 230 respectively. The $a_{n+1}$ and $b_{n+1}$ signals on lines 222 and 226 are useful in equation 1 for the high frequency system of the prior art and if a low frequency system alone is desired these signals need not be used.

As will be later described, the signals on lines 220-230 are in proper order with the "a" signals appearing on lines 220, 222 and 228 while the "b" signals appear on lines 224, 226 and 230. The pulses from the clock phase sequencer 214 that cause the signals to appear in this proper order will hereinafter be referred to as valid data pulses. After the first valid data pulse, the next clock phase pulse from sequencer 214 will cause the shift register 206 to produce outputs as follows: $b_n$ on line 220, $b_{n+1}$ on line 222, $a_{n+1}$ on line 224, $a_{n+2}$ on line 226, $b_{n+8}$ on line 228 and $a_{n+9}$ on line 230. Since these signals are in different order; i.e., the "a" signals appearing on lines 224, 226 and 230 and the "b" signals appearing on lines 220, 222 and 228, the information is not useful and the pulse from the clock phase sequencer 214 causing this to occur is not a valid data pulse. On the third pulse from the clock phase sequencer 214, the output on line 220 becomes $a_{n+1}$, that on line 222 $a_{n+2}$, that on line 224 $b_{n+1}$ and that on line 226 $b_{n+2}$, that on line 228 $a_{n+9}$ and that on line 230 $b_{n+9}$ which is again in the proper sequence so that the pulse from the phase sequencer 214 is again a valid data pulse. It is seen that every other pulse from clock phase sequencer 214 on line 216 produces a valid data pulse and the subscripts of the signals appearing on lines 220-230 increase by one for every new valid data pulse. As will be seen in connection with the description of FIG. 8, the valid data pulses are used to determine the values required by the summation of equation 2. The process continues for one complete cycle until line 220 carries the signal from the "a" detector of the next-to-last or m−1 of the detector pairs which, in the present example, would be $a_{31}$. At the completion of the cycle, line 222 carries the signal from the "a" detector in the last or m of the detector pairs which, in the present example, would be $a_{32}$, line 224 carries the signal from the "b" detector in the next-to-last or m−1 of the detector pairs which, in the present example, would be $b_{31}$ and line 266 carries the signal from the "b" detector in the last or m of the detector pairs which, in the present example, would be $b_{32}$. As will be described, the cycle for the low frequency circuit will be complete after 24 valid data pulses when the signals on lines 228 and 230 have, in the present example, reached $a_{32}$ and $b_{32}$ respectively and if the low frequency circuit were used above, the cycle could be made to stop and repeat after 24 valid data pulses. However, when it is desired to utilize the high frequency circuit also, then the cycle must continue for 31 valid data pulses until the signals on line 222 and 226 are $a_{32}$ and $b_{32}$ respectively.

In the present example, there will be 32 valid date pulses in a cycle, 24 of which will be used in connection with the low frequency circuit and 31 of which will be utilized with the high frequency circuit.

The 32 valid data pulse produces a reset signal that starts the next cycle. Lines 220-230 are shown in FIG. 7 to be connected to an algorithm processor 235 which operates as will be described in connection with FIG. 8 to produce an output on line 237 indicative of the sign of equation 2 above. The output on line 237 may be used to actuate an indicator 238 to show the direction the lens 201 must be moved to achieve proper focus or, as also shown in FIG. 7, to drive a reversible motor at 239 which, by means of a mechanical connection shown as dashed line 241, automatically moves lens 201 in the direction of arrows 243 to the proper focus position.

The valid data pulses from the clock phase sequencer 214 are presented on a line 245 and by way of a line 246 to the algorithm processor 235 and, via line 247 to a counter 250 identified by CNTR which counts the valid data pulses and produces a first output pulse on a line 254 upon the completion of eight valid data pulses which signals, sometimes referred to hereinafter as the "I transfer" signals, are presented to algorithm processor 235 by line 256 for purposes to be described in connection with FIG. 8. A second output signal pulse from counter 250, sometimes referred to hereinafter as the n−1 signal, occurs after 31 valid data pulses and this signal is also presented via line 258 to algorithm processor 235 for purposes to be explained in connection with FIG. 8. A third output signal pulse from counter 250, sometimes referred to hereinafter as the system reset or n signal, occurs after 32 valid data pulses and this signal is presented via a line 260 and line 204 to the transfer means 202 so that upon completion of the cycle, the signals on the individual detectors of array 200 may again be transferred into the shift register 206 for use in the next cycle of operation. The system reset or n signal is also connected from counter 250 via line 260 and a line 261 to the input of algorithm processor 235 for purposes to be explained in connection with FIG. 8.

The I transfer pulse on line 254 is also presented by way of a line 262 to a one-shot multivibrator 264 identified by "O.S.". Multivibrator 264 produces an output pulse signal, sometimes referred to hereinafter as the I reset signal, on a line 266 after every time it receives a signal on line 262, in other words, multivibrator 264 produces an I reset signal on line 266 after the 8th, 16th, 24th and 32nd valid data pulses in the present example. The I reset signal on line 266 is presented to the algorithm processor 235 for purposes to be explained in connection with FIG. 8.

Figure 8:
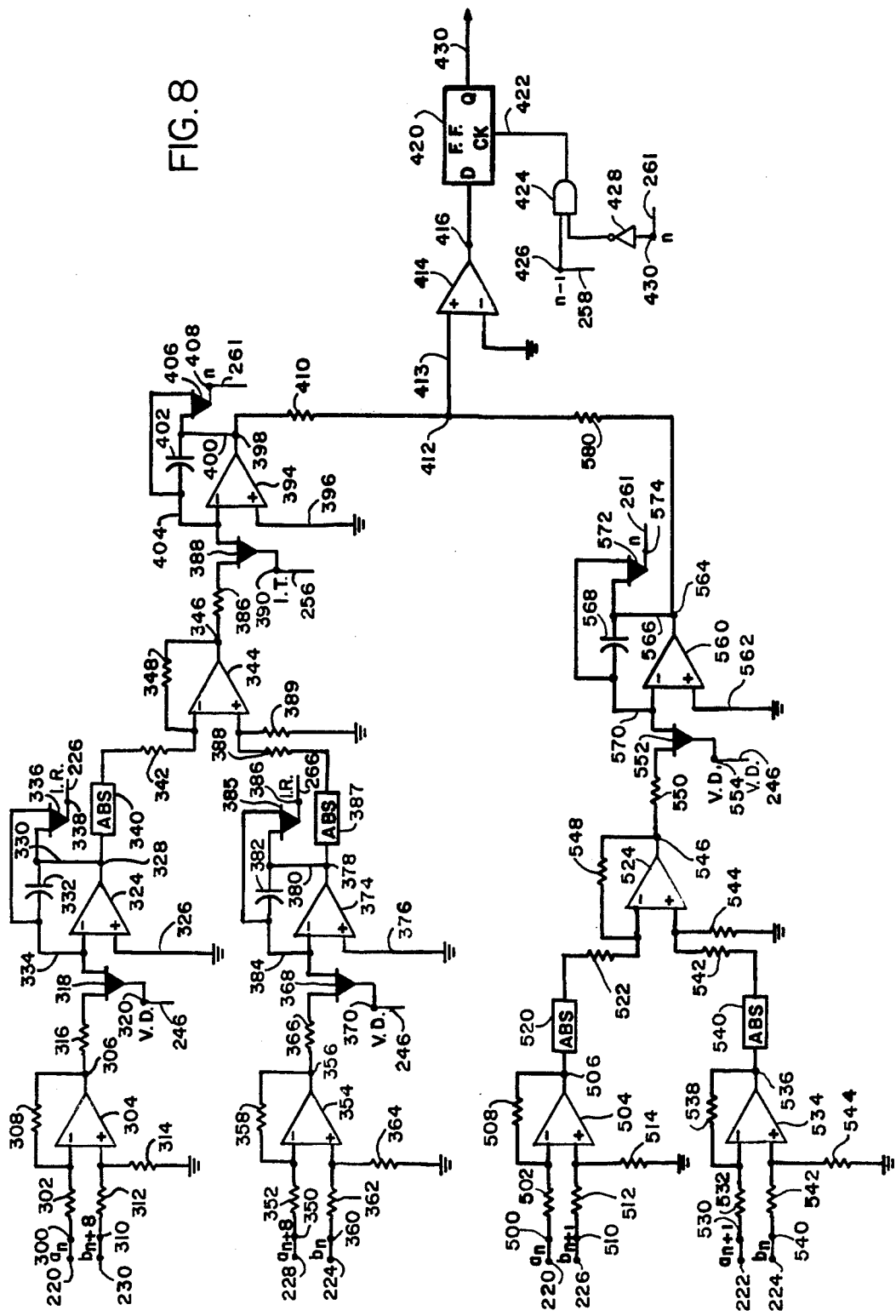
FIG. 8 shows a schematic diagram of the algorithm processor of FIG. 7.

In FIG. 8, a schematic diagram of the algorithm processor 235 is shown and the various lines leading to the algorithm processor of FIG. 8 bear the same reference numerals as in FIG. 7. The circuit in the upper half of FIG. 8 is the low frequency enhancement circuit of the present invention while the circuit in the lower half of FIG. 8 is the high frequency circuit of the above-mentioned copending application Ser. No. 58,964. The two circuits have been combined in FIG. 8 to produce a single output for purposes explained above although it should be understood that the low frequency circuit may be used alone if desired.

In FIG. 8, the $a_n$ signal which appears on line 220 of FIG. 7 is shown applied to a terminal 300 which is shown connected through a resistor 302 to the negative input terminal of an operational amplifier 304, the output of which appears at a terminal 306 and terminal 306 is connected by way of a resistor 308 back to the negative input terminal. The $b_{n+8}$ signal appearing on line 230 of FIG. 7 is shown in FIG. 8 applied to a terminal 310 which is connected through a resistor 312 to the positive input terminal of operational amplifier 304. The positive input terminal is also connected through a resistor 314 to signal ground. Operational amplifier 304 is connected to act as a difference amplifier so that the signal appearing on terminal 306 is representative of the quantity $a_n - b_{n+8}$. This signal is presented through a resistor 316 to one side of a switch 318 which is controlled by a signal at a terminal 320 which signal is received from the valid data line 246 of FIG. 7. Each time a valid data signal swings from a high value to a low value, or a 1 to a 0, switch 318 will close so as to apply the signal from operational amplifier 304 through resistor 316 to the negative input terminal of an operational amplifier 324. The positive input terminal of operational amplifier 324 is connected by a line 326 to signal ground. The output of operational amplifier 324 appears at a terminal 328 which is shown connected by way of a line 330 to one side of a capacitor 332 the other side of which is connected by a line 334 to the negative input terminal of operational amplifier 324. Capacitor 332 has connected thereacross a switch 336 which is controlled by a signal at terminal 338. Terminal 338 receives the I reset signal on line 266 of FIG. 7 and every time the I reset signal swings from a high state to a low state, or from a 1 to a 0, switch 336 will close so as to remove any charge accumulated on capacitor 332. Operational amplifier 324 and capacitor 332 operate as an integrator and sum the signals at the negative input terminal thereof so that the signal appearing at terminal 328 represents $\Sigma(a_n - b_{n+8})$. Terminal 328 is connected through an absolute value circuit 340 identified in the drawing as ABS and through a resistor 342 to the negative input terminal of an operational amplifier 344. Because of the absolute value circuit 340, the signal appearing at the negative input terminal operational amplifier 344 is representative of $|\Sigma(a_n - b_{n+8})|$. The output of operational amplifier 344 appears at a terminal 346 and terminal 346 is connected by way of a resistor 348 back to the negative input terminal of operational amplifier 344.

The $a_{n+8}$ signal which appears on line 228 of FIG. 7 is presented to a terminal 350 in FIG. 8 which is connected through a resistor 352 to the negative input terminals of an operational amplifier 354. The output of operational amplifier 354 appears on a terminal 356 which is shown connected via a resistor 358 back to the negative input terminal. The $b_n$ signal which appears on line 224 of FIG. 7 is presented to a terminal 360 in FIG. 8 which is shown connected through a resistor 362 to the positive input terminal of operational amplifier 354. The positive input terminal of operational amplifier 354 is also shown connected through a resistor 364 to signal ground. Operational amplifier 354, like operational amplifier 304 is connected to operate as a difference amplifier and accordingly, the signal appearing at terminal 356 is representative of $a_{n+8} - b_n$. This signal is presented through a resistor 366 to one terminal of a switch 368. Switch 368 is controlled by the signal at a terminal 370 which is connected to the valid data signal appearing on line 246 of FIG. 7. Every time the valid data signal swings from a high state to a low state, or a 1 to a 0, the signal appearing on terminal 356 through resistor 366 is presented to the negative input terminal of an operational amplifier 374. The positive terminal of operational amplifier 374 is connected via line 376 to signal ground. The output of operational amplifier 374 appears at a terminal 378 which is shown connected by way of a line 380 to one side of a capacitor 382, the other side of which is connected via line 384 to the negative input terminal of operational amplifier 374. Capacitor 382 has connected thereacross a switch 385 which is controlled by a signal at terminal 386 connected to the I reset signal appearing on line 266 of FIG. 7. Each time the I reset signal swings from a high state to a low state, or a 1 to a 0, switch 385 will close and thus remove any charge which may have accumulated on capacitor 382. Operational amplifier 374 and capacitor 382 act as an integrator and sum the signals at the negative input terminal so that the signal appearing on terminal 378 is indicative of $\Sigma(a_{n+8} - b_n)$. Terminal 378 is shown connected to an absolute value circuit 387 identified as ABS, the output of which is connected by way of a resistor 388 to the positive input terminal of operational amplifier 344. The positive terminal of operational amplifier 344 is also shown connected by way of a resistor 389 to signal ground. Because of the absolute value circuit 380, the signal appearing at the positive input terminal of operational amplifier 344 is representative of $|\Sigma(a_{n+8} - b_n)|$.

Operational amplifier 344 operates as a difference amplifier so that the output appearing at terminal 346 is representative of $|\Sigma(a_n - b_{n+8})| - |\Sigma(a_{n+8} - b_n)|$ and this signal is presented through a resistor 386 to one terminal of a switch 388. Switch 388 is controlled by the signal at a terminal 390 which is connected to the I transfer signal appearing on line 256 of FIG. 7. Each time the I transfer signal swings from a high state to a low state, or a 1 to a 0, switch 388 closes so as to present the signal appearing on terminal 346 through resistor 386 to the negative input terminal of an operational amplifier 394. The positive input terminal of operational amplifier 394 is shown connected by way of a line 396 to signal ground. The output of operational amplifier 394 appears on a terminal 398 which is shown connected by way of a line 400 to one side of a capacitor 402, the other side of which is connected via line 404 to the negative input terminal of operational amplifier 394. Capacitor 402 has connected thereacross a switch 406 which is controlled by the signal appearing on a terminal 408 that is connected to the system reset or n signal appearing on line 261 of FIG. 7. Each time the n signal swings from a low state to a high state, or from a 0 to a 1, switch 406 will operate to close and thus remove any charge that may have accumulated on capacitor 402. Operational amplifier 394 and capacitor 402 act as an integrator and sum the signals appearing at the negative input terminal of operational amplifier 394 so that the signal appearing at terminal 398 is representative of $\Sigma|\Sigma(a_n-b_{n+8})|-|\Sigma(a_{n+8}-b_n)|$ and this signal is presented through a resistor 410 to a terminal 412 which is connected via a line 413 to the positive input terminal of an operational amplifier 414. The negative input terminal of operational amplifier 414 is shown connected to signal ground and the output of operational amplifier 414 appears at a terminal 416. Operational amplifier 414 is connected so that the output appearing at terminal 416 will be indicative of the sign of the signal appearing at terminal 412. In other words, if the signal at terminal 412 is at all positive, the output of operational amplifier 414 will swing to positive saturation potential while if the signal appearing at 412 is at all negative, the output of operational amplifier 414 will swing to a negative saturation potential. Thus, the signal at terminal 416 will either be positive or negative depending upon the sign of the signal appearing at terminal 412. Terminal 416 is shown connected to the "D" input of a flip-flop 420 having a clock or "CK" input connected to a line 422 which in turn is connected to the output of an AND gate 424. A first input of AND gate 424 is connected to a terminal 426 which receives the n−1 signal appearing on line 258 of FIG. 7. The other input to AND gate 424 is connected to an inverter 428 which in turn is connected to a terminal 430 to receive the n signal appearing on line 261 of FIG. 7. Flip-flop 420 operates to transfer the signal at its "D" input to a "Q" output shown connected to an output line 430 whenever the clock input appearing on line 422 is in a high state or 1 condition. Whenever the signal appearing at the clock input on line 422 is in a low state or 0 condition, the output on line 430 will remain at the value previously transferred and further changes in the signal at terminal 416 will not be transferred to output line 430 until the next clock input on line 422. The clock signal appearing on line 422 will be in a low state or 0 during most of the cycle of operation but will move to a high state or 1 whenever the signal at terminal 426 is in a high state or 1 at the same time that the signal appearing at terminal 430 is in a low state or 0, which, after inversion by inverter 428, is a 1 signal to AND gate 424. As n−1 signal at terminal 426 swings from a low state to a high state, or a 0 to a 1, after the 31st valid data pulse has occurred by virtue of the action of counter 250 of FIG. 7. The signal at terminal 426 is in a low state during most of the cycle of operation and moves from the low to the high state at the beginning of the 32nd valid data pulse. Accordingly, both inputs to AND gate 424 will be positive only during the time from the end of the 31st valid data pulse to the beginning of the 32nd valid data pulse. It is during this time that a high state or 1 signal clock pulse will be presented to flip-flop 420 to transfer the signal at terminal 416 to the output line 430 and this signal will be representative of equation (2), that is, $\Sigma|\Sigma(a_n-b_{n+8})|-|\Sigma(a_{n+8}-b_n)|$ assuming that the high frequency circuit of copending application Ser. No. 58,964 is not used. It is, therefore, seen that the output at line 430 is indicative of the desired low frequency signal and this signal may be used to drive the motor 239 of FIG. 7 so as to adjust the position of lens 201 to the proper focus position.

The lower half of FIG. 8 shows a circuit like that found in copending application Ser. No. 58,964 which operates to produce an output such as shown in FIG. 2 which, as explained above, responds to the high frequency components of the scene being viewed. The $a_n$ signal, which appears on line 220 of FIG. 7, is presented to a terminal 500 in FIG. 8 which terminal is connected by a resistor 502 to the negative input terminal of an operational amplifier 504. The output of operational amplifier 504 appears at a terminal 506 which is connected through a resistor 508 back to the negative input terminal. The signal $b_{n+1}$, which appears on line 226 of FIG. 7, is presented to a terminal 510 in FIG. 8 which terminal is connected through a resistor 512 to the positive input terminal of operational amplifier 504. The positive terminal of operational amplifier 504 is also connected by a resistor 514 to signal ground. Operational amplifier 504 is connected to act as a difference amplifier and accordingly, the signal at terminal 506 is representative of $a_n-b_{n+1}$. Terminal 506 is connected through an absolute value circuit 520, and through a resistor 522 to the negative input terminal of an operational amplifier 524. Because of the absolute value circuit 520, the output thereof and the input to the negative terminal of operational amplifier 524 is representative of $|a_n-b_{n+1}|$.

The signal $a_{n+1}$, which appears on line 222 of FIG. 7, is presented to a terminal 530 in FIG. 8 which terminal is connected through a resistor 532 to the negative input terminal of an operational amplifier 534. Operational amplifier 534 has an output terminal 536 which is shown connected through a resistor 538 to the negative input terminal of operational amplifier 534. The $b_n$ signal, which appears on line 224 of FIG. 7, is presented to a terminal 540 in FIG. 8 which is shown connected through a resistor 542 to the positive input terminal of operational amplifier 534. The positive terminal of operational amplifier 534 is also connected through a resistor 544 to signal ground. Operational amplifier 534, like operational amplifier 504, acts as a difference amplifier so that the signal appearing on terminal 536 is representative of $a_{n+1}-b_n$. This signal is presented through an absolute value circuit 540 and through a resistor 542 to the positive input terminal of operational amplifier 524. The positive input terminal of operational amplifier 524 is also connected through a resistor 544 to signal ground. Because of the absolute value circuit 540, the output thereof and the input to the positive terminal of operational amplifier 524 is representative of $|a_{n+1}-b_n|$.

The output of operational amplifier 524 appears on a terminal 546 which is shown connected through a resistor 548 back to the negative input terminal of operational amplifier 524. Operational amplifier 524 is connected to act as a difference amplifier and accordingly, the signal on output terminal 546 is representative of $|a_n-b_{n+1}|-|a_{n+1}-b_n|$. This signal is presented through a resistor 550 to one side of a switch 552. Switch 552 is controlled by the signal at a terminal 554 which receives the valid data signals appearing on line 246 of FIG. 7. Accordingly, everytime a valid data signal swings from a high value to a low value, or a 1 to a 0, switch 552 operates to transfer the signal from the output terminal 546 through resistor 550 to the negative input terminal of an operational amplifier 560. The positive input terminal of operational amplifier 560 is connected by a line 562 to signal ground. The output of operational amplifier 560 appears on a terminal 564 which is shown connected by a line 566 to one side of a capacitor 568, the other side of which is connected by a line 570 to the negative input terminal of operational amplifier 560. Capacitor 568 has connected thereacross a switch 572 which is controlled by the signal on a terminal 574 indicative of the system reset or n signal appearing on line 261 of FIG. 7. Each time the system reset or n signal swings from a low state to a high state, or 0 to 1, switch 572 will close so as to discharge any signal which has accumulated on capacitor 568. Operational amplifier 560 and capacitor 568 operate as an integrator to sum the signals appearing on the negative input terminal of operational amplifier 560 so that the output signal at terminal 564 is representative of $\Sigma |a_n - b_{n+1}| - |a_{n+1} - b_n|$. This signal is the high frequency signal obtained from the circuit of the above-mentioned copending application serial No. and is presented through a resistor 580 to the junction point 412. Thus, in the case where it is desired to combine the high frequency and low frequency circuits, the signal on terminal 412 will be the sum of the signals appearing from the output of operational amplifier 394 and the output of operational amplifier 560. As explained above, if this summed signal is positive, then at the completion of a cycle, the signal on line 430 will be positive so as to drive the motor and taking lens in a first direction towards proper focus. If the signal at terminal 412 is negative, then the output on line 430 will be negative so as to drive the motor and taking lens in the opposite direction towards a proper focus position.

Figure 9:
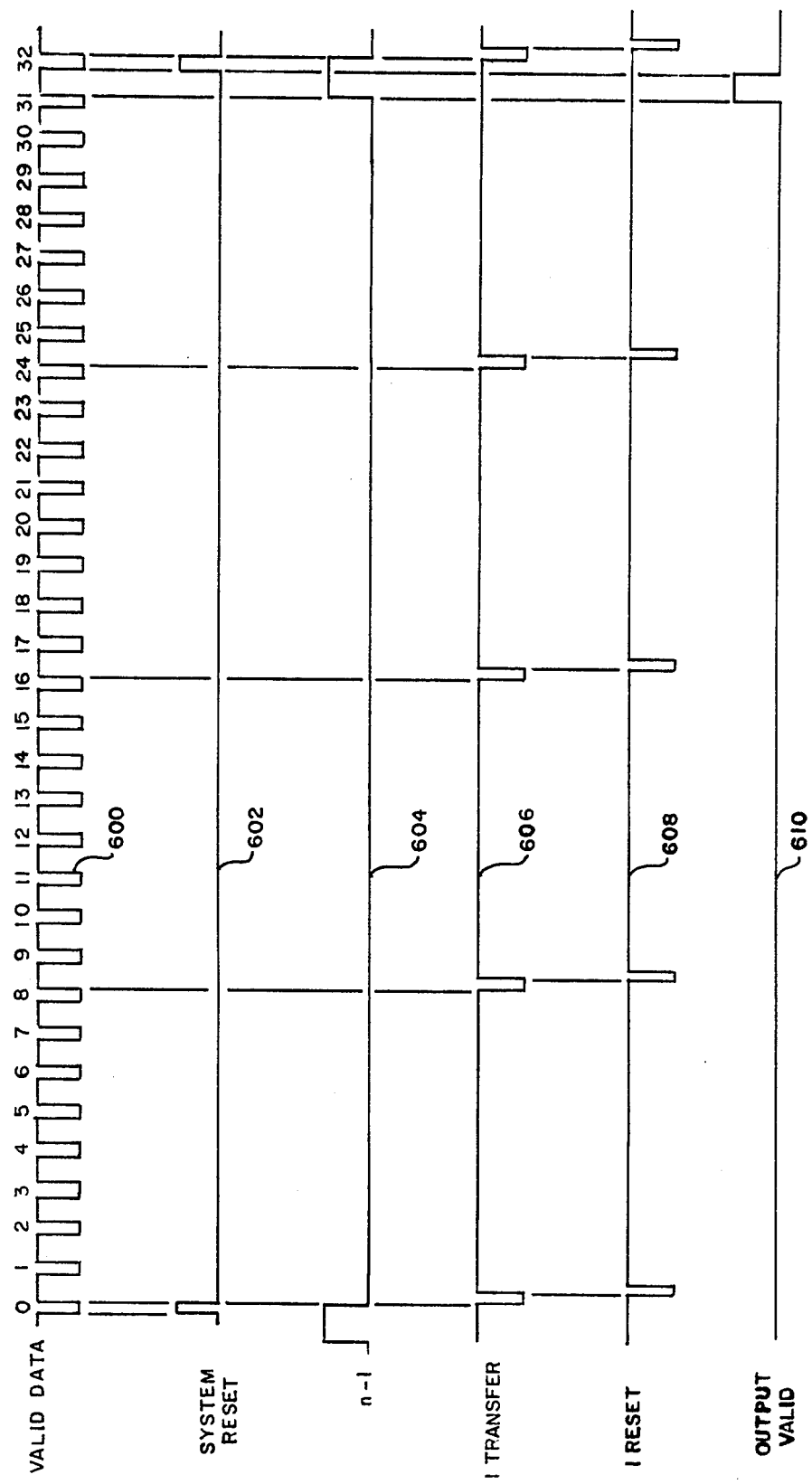
FIG. 9 shows a timing diagram useful in the analysis of the operation of FIGS. 7 and 8.

To better understand the various signals and their timing arrangement, attention is directed to FIG. 9. FIG. 9 is a series of graphs showing how the various signals in the system discussed above occur with respect to one another. In FIG. 9 the upper most graph, identified by reference numeral 600, is indicative of the valid data pulses which come from the clock phase sequencer 214 and appear on lines 245, 246 and 247 of FIG. 7. One complete cycle of these pulses has been shown in FIG. 9 so that there are 32 separate pulses from a high state to a low state indicated and numbered in FIG. 9.

The second graph of FIG. 9, identified by reference numeral 602, shows the system reset or n signal coming from counter 250 and appearing on lines 260, 204 and 261 in FIG. 7. It is seen that the counter changes state from a low value, or 0, to a high value, or 1, once each cycle at the same time as the 32nd valid data pulse. As explained above, the system reset pulse operates to remove any charges which may have occurred on capacitors 402 and 560 of FIG. 8 and thus resets the integrators for the next cycle of operation.

The third graph of FIG. 9, identified by reference numeral 604, represents the n−1 pulses which eminate from counter 250 and appear on line 258 of FIG. 7. The n−1 signal rises from a low state to a high state, or a 0 to a 1, upon the conclusion of the 31st valid data pulse and remains in a high state until the conclusion of the 32nd valid data pulse. The n−1 pulse is utilized primarily for the high frequency circuit as will be explained and it, in combination with the system reset or n pulse, causes the transfer of the output of operational amplifier 414 to the final output on line 430 of FIG. 8.

The fourth graph of FIG. 9, identified by reference numeral 606, represents the I transfer signal eminating from counter 250 and appearing on lines 254, 256 and 262 of FIG. 7. The I transfer signal is a pulse which changes from a high level to a low level at the conclusion of every eighth valid data pulse and is used primarily in the low frequency circuit of FIG. 8 to cause the transfer from the output of operational amplifier 344 to the input of operational amplifier 394. By this means, operational amplifier 394 receives and integrates the summed output of operational amplifier 344 in steps of eight samples in the present example.

The fifth graph shown in FIG. 9 and identified by reference numeral 608 represents the I reset signal appearing at the output of the one-shot multivibrator 264 on line 266 of FIG. 7. This signal changes from a high value to a low value, or a 1 to a 0, at the conclusion of each I transfer signal shown in graph 606. The I reset signal is used in the low frequency circuit of FIG. 8 to cause switches 336 and 386 to remove the charges from capacitors 332 and 382 respectively and thus permit the integrators to sum the next group of eight signals which occur at the output of operational amplifiers 304 and 354 respectively.

The last graph of FIG. 9, identified by reference numeral 610, is termed output valid and represents the signal appearing at the output of AND gate 424 on line 422 of FIG. 8. This signal changes from a low state to a high state at the conclusion of the 31st valid data pulse and returns to a low state at the beginning of the 32nd valid data pulse. Thus, only when 31 valid data pulses have occurred are the outputs of both the low frequency and high frequency circuits of FIG. 8 representative of the desired summations and it is at this time that the clock signal to flip-flop 420 operates to transfer the then valid output from operational amplifier 414 to output line 430. The signal must return to a low state so as to freeze the output appearing on line 430 prior to the removal of the signals on capacitors 402 and 568 of FIG. 8 which, as explained above, occurs at the beginning of the 32nd valid data pulse.

The low frequency circuit of FIG. 9 only requires 24 valid data pulses, in the present example, to complete its cycle of operation since the inputs to this circuit are representative of the outputs of detectors spaced eight units apart. Thus, during the first eight valid data pulses, terminals 300 and 310 receive outputs from "a" detectors one through eight and "b" detectors 9 through 16 respectively while terminals 350 and 360 receive outputs from "a" detectors 9 through 16 and "b" detectors one through eight respectively. After this has occurred, the I transfer signal appearing at terminal 390 causes the first eight summed signals to be transferred to the integrator comprised of operational amplifier 394 and capacitor 402. Immediately thereafter the I reset signal at terminals 338 and 387 discharges capacitors 332 and 382 so that the next cycle of summing can look at "a" signals 9 through 16 at terminal 300, "b" signals 17 through 24 at terminal 310, "a" signals 17 through 24 at terminal 350 and "b" signals 9 through 16 at terminal 360. At the conclusion of this next cycle, the I transfer signal at terminal 390 again transfers the output of operational amplifier 344 to the integrator comprised of operational amplifier 394 and capacitor 402 so that the second set of eight summed signals may be added to the first set being stored in capacitor 402. Immediately after this is accomplished, the I reset signal on terminals 338 and 387 discharge capacitors 332 and 382 to allow the third cycle of operation to occur. During this third cycle of operation, "a" signals 17 through 24 will appear on terminal 300, "b" signals 25 through 32 will appear on terminal 310, "a" signals 25 through 32 will appear on terminal 350 and "b" signals 17 through 24 will appear on terminal 360. These signals are then summed at the integrators comprised of operational amplifiers 324 and 374 and capacitors 332 and 382 and upon the occurrence of the third I transfer signal at terminal 390, the third summed signal at the output of operational amplifier 394 will be transferred to the integrator comprised of operational amplifier 394 and to be summed with the first two summed groups on capacitor 402. Therefore, at the conclusion of the 24th valid data pulse, the outputs of "a" detectors 1 through 24 have been presented at terminal 30, the outputs of "b" detectors 9 through 32 have been presented at terminal 310, the outputs of "a" detectors 9 through 32 have been presented at terminal 350 and the outputs of "b" detectors 1 through 24 have been presented at terminal 360. During the 25th through 32nd valid data pulses, additional signals appear at terminals 300, 310, 350 and 360 and these signals will be summed at the integrators comprised of operational amplifiers 324 and 374 in combination with capacitors 332 and 382 but the summed signals at the output of operational amplifier 344 will have no effect on the low frequency circuit of FIG. 8 since before the I transfer signal can transfer the signal to the integrator comprised of operational amplifier 394 and capacitor 402 (after valid data pulse 32) the system reset signal at terminal 408 has occurred (at the beginning of valid data pulse 32) and capacitor 402 will be discharged during the entire I transfer pulse. Thus, only the signal across the capacitor 402 that exists at the conclusion of the 31st valid data pulse; i.e., the sum of the first three sets of sight signals, is presented to operational amplifier 414 when the n−1 signal operates to trigger the flip-flop 420 and produce the final output on line 430.

On the other hand, in the high frequency circuit of the lower portion of FIG. 8, 31 valid data pulses must be employed since the inputs to the circuit include the outputs of "a" detectors 1 through 31 and "b" detectors 2 through 32 at terminals 500 and 510 respectively and the outputs of "a" detectors 2 through 32 and "b" detectors 1 through 31 at terminals 530 and 540 respectively. Thus, 31 valid data pulses are necessary to completely examine the detectors for purposes of obtaining the high frequency output. During the time between the conclusion of the 31st valid data pulse and the start of the system reset pulse, the signals at the input of operational amplifier 414 are valid for both the high frequency and low frequency circuits. This is shown by the output valid graph of FIG. 9. It is during this time that the n−1 pulse triggers flip-flop 420 to produce the resultant output on line 430.

It is, therefore, seen that we have provided a range finding circuit operable to use the low frequency components of a high frequency signal and thus prevent improper 0 cross-overs which could cause erroneous focus settings. It is also seen that we have provided a circuit which combines the high frequency responsive system of the prior art with the low frequency of system above to produce a final output signal having the advantage of steep slope at the proper 0 cross-over point for greater accuracy while still preventing the improper 0 cross-over problem of a high frequency system. Many modifications and changes will occur to those skilled in the art. For example as previously explained, 32 detectors in groups of eight have been chosen for the preferred embodiment but other numbers of detectors and other groupings could be employed. Likewise, while we have shown the low frequency circuit and high frequency circuits added to provide the combined output having both advantages, other means for providing this dual advantage may be easily devised; e.g., (1) adding the low frequency output to the high frequency outut only when the low frequency output exceeds some predetermined minimum value which would allow the low frequency circuit to be used to control improper 0 crossings but have no effect when the output summation was near the proper 0 crossing; (2) the outputs of the low frequency and high frequency circuits could be combined utilizing nonlinear amplification of the low frequency output so as to make small values of this output less important to the overall output near the proper 0 crossings but to make the low frequency output of high importance in areas where improper 0 cross-overs may occur; (3) a switch might be employed so that the low frequency output controlled the final output alone so long as its value exceeded a predetermined minimum value below which the high frequency circuit would control the final output by itself.

Finally, the various integrators, difference circuits, switches and other circuits shown in the preferred embodiment have counterparts in the prior art operable to perform equivalent operations. Accordingly, we do not wish to be limited to the specific elements used in describing the preferred embodiment but intend rather only to be limited by the following claims.

The embodiments of the invention in which an exclusive properply or right is claimed are defined as follows:

1. Apparatus for use with an auto focus system which includes lens means that produces first and second radiation patterns of a scene, the patterns being similar and in a relative first condition when the lens means is in a proper focus position, in a relative second condition when the lens means is on a first side of the proper focus position and in a relative third condition when the lens means is on a second side of the proper focus position comprising, in combination:

a first group of radiation detectors positioned to receive radiation corresponding to a first portion of the first pattern and to produce a first plurality of output signals in accordance therewith;

a second group of radiation detectors positioned to receive radiation corresponding to a second portion of the first pattern and to produce a second plurality of output signals in accordance therewith;

a third group of radiation detectors positioned to receive radiation corresponding to a first portion of the second pattern and to produce a third plurality of output signals in accordance therewith;

a fourth group of radiation detectors positioned to receive radiation corresponding to a second portion of the second pattern and to produce a fourth plurality of output signals in accordance therewith; and signal receiving means connected to said first, second, third and fourth groups of detectors to receive the first, second, third and fourth plurality of output signals respectively and to produce a resultant signal representative of the absolute value of the difference between the sum of the first plurality of output signals and the sum of the fourth plurality of output signals less the absolute value of the difference between the sum of the second plurality of output signals and the sum of the third plurality of output signals, the resultant signal having a first characteristic when the patterns are in the relative second condition and having a second characteristic when the patterns are in the relative third condition as an indication of the lens means being on the first or second side respectively of the proper focus position.

2. Apparatus according to claim 1 wherein said first and second groups of detectors are members of a first array of radiation detector groups each containing a plurality of radiation detectors all of which are positioned to receive radiation corresponding to the first pattern at different positions therein and to produce output signals in accordance therewith, said third and fourth groups of detectors are members of a second array of radiation detector groups each containing a plurality of radiation detectors all of which are positioned to receive radiation corresponding to the second pattern at different positions therein and to produce output signals in accordance therewith, said signal receiving means receiving the output signals of the detectors in all of the groups of detectors in the first and second arrays and the resultant signal is representative of the sum of the absolute value of the difference between the sum of the output signals from successive groups of detectors in the first array and the groups of detectors in the second array less the absolute value of the difference between the sum of the output signals from alternate successive groups of detectors in the first array and the groups of detectors in the second array.

3. Apparatus according to claim 2 including responsive means connected to said signal receiving means to receive the resultant signal and to provide an indication of the characteristic.

4. Apparatus according to claim 3 wherein the responsive means is connected to the lens means to move the lens means toward the proper focus position.

5. Apparatus of the class described comprising, in combination:
- a first group of radiation detectors $A_1, A_2 \ldots A_y$ mounted in a first portion of a first array with each detector operable to produce an output $a_1, a_2 \ldots a_y$ representative of the radiation received thereby;
- a second group of radiation detectors $A_{y+1}, A_{y+2} \ldots A_{y+y}$ mounted in a second portion of the first array with each detector operable to produce an output $a_{y+1}, a_{y+2} \ldots a_{y+y}$ representative of the radiation received thereby;
- a third group of radiation detectors $B_1, B_2 \ldots B_y$ mounted in a first portion of a second array with each detector operable to produce an output $b_1, b_2 \ldots b_y$ representative of the radiation received thereby;
- a fourth group of radiation detectors $B_{y+1}, B_{y+2} \ldots B_{y+y}$ mounted in a second portion of the second array with each detector operable to produce an output $b_{y+1}, b_{y+2} \ldots b_{y+y}$ representative of the radiation received thereby;
- radiation transmissive means for transmitting radiation from a remote object so as to produce first and second radiation patterns at the first and second arrays respectively, when said radiation transmissive means is in a first position relative to the remote object, the first and second patterns produce substantially equal radiation on detectors having the same subscripts in the first and second arrays, when said radiation transmissive means is in a second position relative to the remote object, the first and second patterns change so that detectors with the same subscripts in the first and second arrays normally receive different radiation; and
- signal responsive means connected to the detectors in the first and second arrays to receive the output signals therefrom and to produce a resultant output which varies with the absolute value of the difference between the sum $a_1, a_2 \ldots a_y$ and the sum $b_{y+1}, b_{y+2} \ldots b_{y+y}$ less the absolute value of the difference between the sum $a_{y+1}, a_{y+2} \ldots a_{y+y}$ and the sum $b_1, b_2 \ldots b_y$.

6. Apparatus according to claim 5 wherein the resultant output of said signal responsive means varies in accordance with the expression:

$$I = \sum_{I=0}^{X-2} \left| \sum_{n=YI+1}^{n=YI+Y} (a_n - b_{n+y}) \right| - \left| \sum_{n=YI+1}^{n=YI+Y} (a_{n+y} - b_n) \right|$$

where X is the number of groups of detectors in the first and second arrays, Y is the number of detectors in each group of detectors, n is the total number of detectors in the first and second arrays, $a_n$ is the output from a first detector in the first array, $a_{n+y}$ is the output from a second detector in the first array separated by Y detectors from the first detector in the first array, $b_n$ is the output from a first detector in the second array, $b_{n+y}$ is the output from a second detector in the second array separated by Y detectors from the first detector in the second array and I is the whole number.

7. Apparatus according to claim 6 wherein each detector in the first array is mounted in a pair with a detector in the second array.

8. Apparatus according to claim 7 including further means connected to receive the resultant output and to produce a further output indicative of the sign of the resultant signal.

9. Apparatus according to claim 8 further including motive means connected to said further means to receive the further output and to move said radiation transmissive means in accordance therewith.

10. Apparatus for use with a focus determining system which includes lens means that produce first and second radiation distribution patterns of a scene, the radiation distribution patterns normally containing high frequency and low frequency components and being similar, the patterns being in a first relative position when the lens means is in a proper focus position, being in a second relative position when the lens means is on a first side of the proper focus position and being in a third relative position when the lens means is on a second side of the proper focus position comprising:
- a first plurality of radiation detectors $A_1, A_2 \ldots A_n$ each operable to produce an output $a_1, a_2 \ldots a_n$ indicative of the radiation received thereby;
- a second plurality of radiation responsive detectors $B_1, B_2 \ldots B_n$ each operable to produce an output $b_1, b_2 \ldots b_n$ indicative of the radiation received thereby;
- means mounting the first plurality of detectors so that each detector thereof receives radiation in a different portion of the first pattern;
- means mounting the second plurality of detectors so that each detector thereof receives radiation in a different portion of the second pattern;
- signal conditioning means connected to said first and second pluralities of detectors to receive the outputs of all of the detectors and to produce a resultant output that varies primarily only with low frequency components according to the expression:

$$I = \sum_{I=0}^{(M/Y)-2} \left| \sum_{n=YI+1}^{n=YI+Y} (a_n - b_{n+Y}) \right| - \left| \sum_{n=YI+1}^{n=YI+Y} (a_{n+Y} - b_n) \right|$$

where M is the number of detectors in each of the first and second plurality of detectors, n is a number between 1 and M inclusive, Y is a factor of M representing a predetermined number of detectors to be considered in groups so that M/Y represents the number of such groups of detectors; $a_n$ represents the output of a first detector in a first group of detectors receiving radiation in the first pattern, $a_{n+Y}$ represents the output of a first detector in a second group of detectors receiving radiation in the first pattern, $b_n$ represents the output of a first detector in a first group of detectors receiving radiation in the second pattern and $b_{n+Y}$ represents the output of a first detector in a second group of detectors receiving radiation in the second pattern, the resultant output thereby varying with changes in the average output of Y detectors taken together so as to represent low frequency variations in the first and second distribution patterns.

11. Apparatus according to claim 10 further including responsive means connected to said signal conditioning means to receive the resultant output and to provide a control signal indicative of the relative position of the first and second radiation distribution patterns.

12. Apparatus according to claim 11 wherein said responsive means includes motive means to move the lens means toward the proper focus position.

13. Apparatus according to claim 10 wherein said signal conditioning means also operates to produce a further resultant output that varies primarily only with the high frequency components according to the expression:

$$\sum_{n=1}^{n=M-1} |a_n - b_{n+1}| - |a_{n+1} b_n|$$

where M is the number of detectors in each of the first and second plurality of detectors, n is any number between 1 and M inclusive, $a_n$ represents the output of a first detector receiving radiation in the first pattern, $a_{n+1}$ represents the output of the next successive detector receiving radiation in the first pattern, $b_n$ represents the output of a first detector receiving radiation in the second pattern and $b_{n+1}$ represents the output of the next successive detector receiving radiation in the second pattern, the further resultant output thereby varying with changes in the individual outputs of the detectors so as to represent high frequency variation in the first and second distribution patterns; and further including combining means connected to said signal conditioning means to receive the resultant output and the further resultant output and to produce a combined signal which varies with the low frequency and the high frequency components in the first and second radiation distribution patterns.

14. Apparatus according to claim 13 further including responsive means connected to said combining means to receive the combined signal and to provide a control signal indicative of the relative position of the first and second radiation distribution patterns.

15. Apparatus according to claim 14 wherein said responsive means includes motive means to move the lens means toward the proper focus position.

* * * * *